July 26, 1966  D. ARONSON  3,262,282
ABSORPTION REFRIGERATION SYSTEM CONTROL
Filed Feb. 1, 1965  3 Sheets-Sheet 1

FIG. I

DAVID ARONSON
INVENTOR.

BY Daniel H. Bobis
Atty

DAVID ARONSON
*INVENTOR.*

3,262,282
ABSORPTION REFRIGERATION SYSTEM CONTROL

David Aronson, Upper Montclair, N.J., assignor to Worthington Corporation, Harrison, N.J., a corporation of Delaware
Filed Feb. 1, 1965, Ser. No. 429,513
7 Claims. (Cl. 62—141)

This is a continuation in part of application Ser. No. 338,488, filed January 17, 1964.

In general, this invention relates to an absorption refrigeration system of the type which circulates a saline solution, and, more particularly, it relates to a means for protecting the absorption refrigeration system against saline solution overconcentration.

In absorption refrigeration systems, a saline solution, consisting of a salt such as lithium bromide as the solute and water as the solvent, is circulated with variations in the concentration of the solute. Water is the refrigerant which circulates in both its liquid and vapor phase. The temperature and pressure of the system, under certain conditions, is such that the saline solution will tend to crystallize and plug or block passages such that the machine in effect becomes inoperable. Such an occurrence is prompted by circumstances in which the temperature of the solution drops below a predetermined point with respect to the solution concentration and the pressure of the system. When this occurs, a solid salt will be precipitated from the solution.

In a lithium bromide absorption refrigeration system in which there is no control of solution concentration in the generator, it is possible to crystallize the lithium bromide in the heat exchanger or absorber when non-condensibles accumulate in the absorber. Such non-condensibles limit the absorption of the water refrigerant and lead to an increase in the concentration of solution being circulated in the absorber. This increase in concentration, if not detected, will cause crystallization and plugging.

By maintaining a flow of intermediate strength solution as diluent of the stream leaving the generator, it is possible, by the utilization of a single switching element, to stop the operation of the absorption refrigeration machine prior to the above mentioned plugging.

Thus, in the solution control and dilution system described in U.S. patent application Serial No. 338,488 filed January 17, 1964, entitled "Absorption Refrigeration System Control" by the present inventor, a method of utilizing a dilution stream was disclosed, which method leads to a maximum concentration during normal operations of 66.5 percent lithium bromide solution entering the high temperature, high concentration solution side of the heat exchanger. This high concentration lithium bromide solution, prior to its flow down the ducts from the discharge of the generator to the inlet of the heat exchanger, is in contact with steam above the surface of the solution. A diluent stream is mixed with the high concentration solution ahead of the inlet to the heat exchanger. The vapor pressure of such a cooled, mixed solution is less than the pressure of stream in the generator so that steam is absorbed into the mixed strong solution bringing its temperature very close to the equilibrium of vapor pressure of the solution with the pressure of the steam.

When the concentration of solution being sprayed in the absorber increased above the normal operating range, the diluent stream which is taken from the circuit also experiences an increase in concentration. The ultimate effect is to produce an excessively strong solution entering the heat exchanger. Such a strong solution will be heated to a higher temperature than the solution of normal strength. The present invention utilizes a single switch to sense this excessively high temperature, which switch is positioned and set to be actuated when an excessive concentration level has been reached so as to shut down the absorption refrigeration system.

Of course, it will be understood that excessive concentration arising from causes other than the accumulation of non-condensibles will also result in the shutdown of the absorption refrigeration system utilizing the principle of the present invention.

Therefore, it is the general object of this invention to to provide an absorption refrigeration means with protection against solution overconcentration.

A further object of this invention is the provision of a new and better safety control for an absorption refrigeration machine which is simple and economical in operation and which will provide an effective control against crystallization and plugging of the absorption refrigeration apparatus.

Other objects will appear hereinafter.

For the purpose of illustrating the invention, there is shown in the drawings, a form which is presently preferred; it being understood, however, that this invention is not limited to the precise arrangements and instrumentalities shown.

In the absorption refrigeration apparatus utilized with the present invention, a first flow of solution in the system is regulated to provide the proper amount of concentrated solution required at the absorber. This flow is variable in accordance with the cooling load imposed on the system. Concurrent with this first flow control, weak solution is intermixed with high concentrated solution at the generator downstream side. This dilution of high concentration avoids crystallization in the heat exchanger at solution temperatures which would ordinarily cause precipitation of salt from the concentrated solution. The present invention utilizes a temperature sensor positioned at the generator downstream side to protect the absorption refrigeration system should the strong solution be heated to an excessively high temperature which would cause crystallization and, the undesirable plugging discussed previously.

Figure 1:
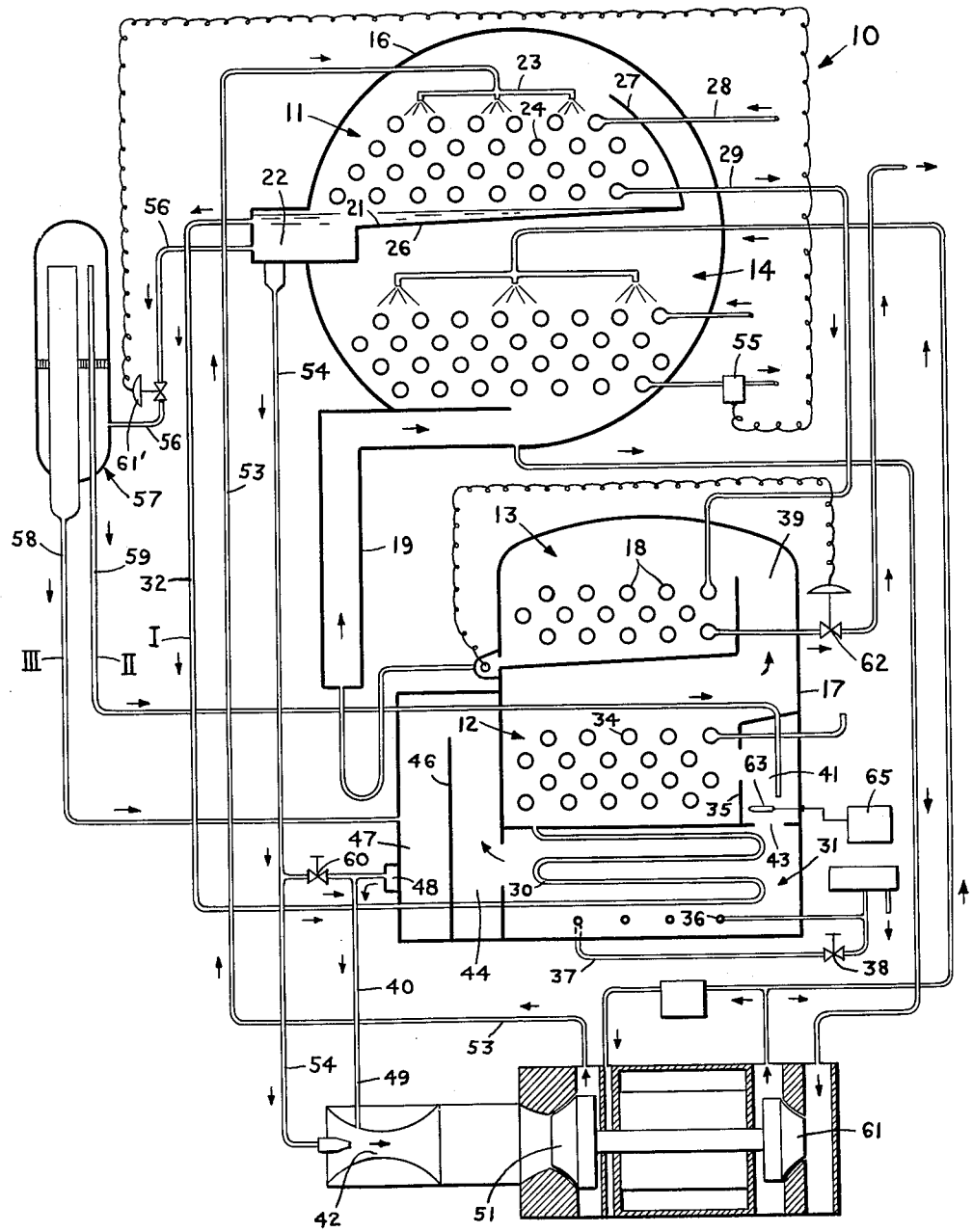
FIGURE 1 is a diagrammatic illustration of an embodiment of the absorption refrigeration system of the present invention.

In FIGURE 1, there is shown the absorption refrigeration apparatus of the present invention generally designated by the numeral 10. This apparatus effects solution-dilution under all but full load conditions. Its effect on concentration is zero at full load; then increases as the load decreases. With corresponding decrease in strong solution flow out of the generator, the net effect is to make the dilution increasingly more significant. The flow control to the generator and flow control of diluent weak solution is achieved by providing a plurality of lines carrying weak solution from the absorber.

At least one line carries a first stream of weak solution to the generator for solution concentration. A second stream is conducted from the absorber and mixed with the first stream to dilute the latter after said first stream has passed through the generator and been concentrated. It is at this point that the present invention utilizes a heat sensor to determine whether the temperature of the combined second and first stream is acceptable or is excessively high from the accumulation of non-condensibles or from other causes, and, if excessively high, shuts down the entire apparatus 10.

In the foregoing and following description, the term solution is used to designate a liquid made up of absorbent and refrigerant being passed through the system, in contrast to the refrigerant stream which operates in both the liquid and vapor phase. The solution, however, although being in the liquid is nonetheless subject to changes in concentration to meet any changes in load normally sensed at the system evaporator which circulates chilled water at temperatures between 40° and 50° Fahrenheit.

The terminology "weak solution" herein referred to defines a condition of the solution in which there is a preponderance of refrigerant so that functionally the solution is weak in absorbing properties. The term "strong solution" on the other hand defines the solution condition where there is a lesser amount of refrigerant so that the solution possesses greater absorption properties.

In FIGURE 1, the absorption refrigeration apparatus includes basic components including an absorber 11, a generator 12, a condenser 13, and an evaporator 14 and a heat exchanger interconnected by suitable piping, pumping and associated control means to define a compact apparatus. The individual elements as taught by the prior art may be interconnected into a single compact package or alternatively they may be interconnected and physically disposed as separate units. As a matter of practicality and to provide a commercially saleable device, the elements are preferably so arranged and spaced as to take up as little volume as possible for the amount of refrigeration produced.

As presently shown, absorber 11 and evaporator 14 are disposed within a low pressure shell enclosure 16 whereby water or refrigerant vapor flows upwardly to the absorber 11 to be connected by spray streams of brine solution. Generator 12 and condenser 13 are positioned in a high pressure shell enclosure 17 and relatively disposed with respect to each other to pass vaporized refrigerant to the condenser for contacting water circulating coils 18. In generator 12, refrigerant is boiled from weak brine solution to concentrate the latter. Released vapor passes upwardly and is condensed in the indirectly cooled condenser located in the high pressure shell. Refrigerant condensate is then pumped or forced upwardly from the high pressure shell 17 through conduit 19 to evaporator 14 in which at least a portion of the condensate flashes.

Weak solution is gravity fed from sump pan 22 in absorber 11 by way of line 32 to generator 12 for concentrating the solution. This flow to the generator varies in concentration between about 55 percent and 61 percent. The volume of solution is adjusted, however, depending on the head of liquid established in pan 21 as required to hold the concentration of absorbent to that value necessary to meet the cooling load imposed upon the system.

Under normal operating conditions, weak solution enters generator 12 at a concentration of from about 55 percent to 61 percent and leaves at about 66 percent to 69 percent concentration. Absorber 11 includes spray trees or nozzles 23 directing sprays of solution against the bundle 24 to form a pool of solution in sump 22 and sump pan 21 in the above mentioned concentrations. It is further understood that in the mention of these concentrations, the solution may also contain rust inhibitor and/or wetting agent in sufficiently small amounts so as not to alter the concentrations. It should be understood that any salt dissolved in the refrigerant is present only as a contaminant and diminishes performance. Systems may nevertheless be designed to use a very weak brine to avoid freezing, but for a normal air conditioning application this does not apply.

Condenser 13 and evaporator 14 define portions of the system holding essentially pure refrigerant.

Structurally, a machine embodying the present absorption system includes an elongated upper shell 16 supported by legs or other means not shown fixed to the under side thereof. The shell is preferably of a unitary welded construction, horizontally disposed, and having end plates including removable access openings defining a substantially air tight inner enclosure. Shell 16 includes upper and lower sections separated by a partition 26 welded or fastened by other means along the end and sides of the shell inner wall and shaped to form the sump 22 and sump pan 21. Solution and refrigerant pumps 61 and 51 may be supported on the shell outer surface, or, if of the hermetic type, may be disposed within one of the shells in direct contact with the liquid being pumped.

Absorber 11 and evaporator 14 are positioned in the upper shell 16. The absorber includes the liquid holding tray-like pan 21 having an upturned edge 27, the pan being positioned substantially horizontally of the shell extending the length thereof. Pan 21 includes the solution holding sump 22 having one edge adjacent the side of the inner wall of the shell. Edge 27 is faced inwardly of the shell forming a spray guard and vapor guide. Cooling coil or tube bundle 24 positioned above tray 21 is provided with an inlet 28 and outlet 29 for circulating water or other cooling fluid. This cooling medium is circulated to the condenser 13, then through a cooling tower not shown, and subsequently circulated back into the machine, by means of a pump, not shown.

Heat exchanger 31 having a coil 30, and which treats weak and strong liquid as they move through the system, is disposed at the lower side of the shell 17 in heat exchange contact with generator 12.

The liquid circulating portion of the system, including absorber 11, generator 12 and heat exchanger 31, embodies a plurality of lines carrying solution in such manner as to control operation of the system in accordance with the cooling load. In absorber sump 22, a varying amount of solution is collected after passing over tubes 24. A plurality of conduits are in communication with sump 22 having their respective inlets thereof disposed at different levels of elevation with respect to each other to receive streams of solution under varying liquid heads.

A first conduit or line 32 connecting absorber sump 22 and the generator 12 passes solution from the sump pan 21 to the coil inlet side of the heat exchanger 31 such that weak solution in line 32 is preheated prior to being reconcentrated. In generator 12, heating mediums such as hot water or steam is directed to bank 34 and after being circulated is passed into a secondary heating exchanger coil 36 so that steam condensate or cooled heating medium may heat outgoing strong solution and thus aid in avoiding the hazard of crystallization due to low temperature on shutdown of the system. A discharge line 37 communicates with the outlet of secondary coil 36 in heat exchanger 31 recirculating heating fluid or steam condensate to the boiler or energy source. Line 37 includes a valve 38 or other flow regulating means such as a steam trap controlling the passage of fluid through the line. Valve 38 is preferably automatically operative in response to a condition within the system to vary flow of condensate through and may, for example, be actuated responsive to the temperature of the condensate immediately upstream of the valve.

From generator 12, refrigerant in vapor form passes upwardly through passage 39 into condenser 13. Concentrated absorbent in generator 12 overflows wall 35 of the generator heating chamber into end compartment 41 and through opening 43 which is in communication with the shell side of heat exchanger 31. Thus, hot solutions at concentrations up to about 66 percent at full load pass into contact with cooling tubes therein. The strong cooled solution discharges into a reservoir chamber 44 at the heat exchanger downstream side. This chamber is provided with an upwardly extending wall 46 having sufficient height to serve as a barrier and hold solution within the generator and heat exchanger in the event that maintenance should be required on the absorber pump 51.

Solution in chamber 44 overflows wall 46 to enter a second chamber 47 having an outlet 48 communicating through conduit 49 to the suction end of absorber pump 51. This flow of strong solution combines upstream of pump 51 suction end with the flow of weak solution in conduit 54 from absorber 11. Means forming a flow restriction 42 is provided in line 54 to cause a drop in liquid pressure so that the pressure of weak solution entering 51 is substantially equal to the pressure of strong solution in line 49. Since the pressure established by this restriction 42 cannot be set exactly, a trimmer valve 60 is provided to effect adjustment so that at full load, the flow of solution is at the rate which gives the highest capacity at the desired heat rate of a given heat input, per ton of refrigeration produced.

To provide the absorber with a substantially constant stream of saline solution at all times regardless of load conditions, the major portion of liquid circulating is handled by the second line 54 disposed in the lower side of the sump at a lesser elevation than the first line 32 carrying solution from the absorber to the heat exchanger. The variation of solution head in the second line 54 is relatively small so that the flow through pump 51 remains relatively constant.

Normally, pump 51 will move a substantially constant flow of solution at all times. However the concentration of solution being moved by the pump through the absorber spray trees 23 will vary in concentration in accordance with the load imposed on the system. The proportioning of the weak and strong solution entering the absorber pump will be determined not by the amount of weak solution entering the pump from line 54, but rather by the amount of strong solution from weir chamber 44 and chamber 47 connected to the pump section.

Although a substantially constant flow of solution through the absorber pump circuit is maintained, a second circuit carries weak refrigerant from the absorber in a controlled flow to vary passage of strong solution from the generator. The substantially constant nature of the flow of solution through the absorber pump circuit arises from the design which provides essentially constant resistance in the form of the nozzles mounted in the spray trees 23 and the characteristics of circulating pump 51 which has an essentially constant discharge head. Hence, these relationships hold:

Flow to pump section=flow discharge to spray nozzles (constant flow rate)
Flow to pump sumption=flow 54 plus flow 49=constant
But flow 54=constant (as set by restriction 42)
Thus flow 49=constant
And flow 49=flow 58 plus flow 30=constant So that as flow 50 increases, flow 30 will decrease by an equal amount and the sum of the two thus remains constant.

Referring to FIGURE 1, the second circuit carrying weak solution includes a third line 56 having an inlet communicating with sump 22 at an elevation above the inlet of second line 54 and below the inlet of the first line 32. Weak solution in the sump 22 is carried through line 56 to the vapor tight receiver 57 holding a supply of the solution. Receiver 57 includes a plurality of conduits 58 and 59 positioned with inlet openings above the lower surface of the receiver to maintain a minimum liquid level therein. Conduits 58 and 59 are sufficiently large in cross-sectional area and are provided with openings of sufficient diameter to receive overflowing weak solution in accordance with the liquid head built up in receiver 57.

Valve means 61' positioned in the third line 56 is responsible to control flow of weak solution to the receiver. The function of this valve will be described hereinafter more fully in the subsequent description of the operation of this embodiment of the apparatus.

Conduit 59 receives at its upper end a stream of weak solution from receiver 57 and is connected to introduce weak solution intermediate generator 12 and the shell side of the heat exchanger 31. Conduit 59 feeds directly into the generator downstream side at chamber 41 to cause mixing of cool, weak solution from receiver 57 with hot concentrated solution passing from the generator. The solution in the chamber 41 is in contact with steam above the surface of the mixed strong solution from the generator 12. The diluent stream from the conduit 59 is at a temperature of about 110° Fahrenheit and tends to cool the strong solution. The vapor pressure of such a cooled solution is less than the pressure of steam in the generator so that steam is absorbed into the mixed strong solution, bringing its temperature very close to equilibrium of vapor pressure of the solution with the pressure of the steam.

When the concentration of the solution being sprayed into the absorber increases beyond the normal operating range, the solution entering and subsequently leaving the generator increases in concentration. The diluent stream through conduit 59 also experiences an increase in concentration or may be cut off. The ultimate effect is to produce an excessively strong solution entering the heat exchanger 31. Such a strong solution will be heated to a higher temperature than solution of normal strength. A temperature sensing element 63 is positioned in the chamber 41 immediately above the opening 43 to measure the temperature of the mixed solution. The temperature sensing element 63 will sense the excessively high temperature which has been caused by the increase in concentration of the solution sprayed in the absorber to effect shutdown of the apparatus 10 through a suitable alarm circuit 65. Of course, it will be understood that excessive concentration may arise from causes other than the accumulation of non-condensibles in the system.

The second conduit 58 also communicated with receiver 57 directs an overflow stream of weak solution from the latter to the lower section of weir chamber 47 communicating with chamber 44 holding a supply of cool concentrated or intermediate strength solution at a temperature less than the generator temperature. Conduit 58 carries a flow of weak solution having a liquid head sufficient to overcome the generator pressure so that the mixture of weak and strong solution within chamber 47 will be dependent at least in part on the flow carried in conduit 58. The effect of this secondary injection of weak solution in the chamber 47 tends to spoil the regeneration operation by reducing flow from the generator at low loads.

*Control of the system*

Operationally, at any reduced load, some saline solution will flow in line 58 by reason of valve 61' opening in response to the load decrease. This weak solution flow will reduce the flow of strong solution into chamber 47 of the heat exchanger by an equal amount. This in turn causes a similar reduction in flow to the generator from the absorber through line 32. Whether a flow develops in line 58 or in line 54, the solution flow is recycled directly back to the absorber and does not enter the generator.

Likewise, line 59 carries weak solution to the downstream side of the generator, which solution after passing through heat exchanger 31 is pumped back into the absorber. Thus the flow in line 53 also does not contribute to flow to and out of the generator.

The net result is that increase in flow through valve 61′ reduces flow out of the generator 12 at partition 35 and the flow into the generator 12 through line 32 and the tube side of the heat exchanger. Weak solution flow through line 32 is slightly greater than the concentrated flow out of the generator by the amount of water picked up in the absorber, or conversely by the amount of water liberated from solution being concentrated in the generator.

Basic control of the system is affected by regulation of the rate of flow of the solution from absorber 11 to the generator 12, which establishes a concurrent equal flow of strong solution leaving the generator for mixing with solution being cycled through the absorber. A reduced rate of flow of weak solution to the generator 12 will lead to an increase in concentration of solution in the generator with a corresponding increase in temperature of strong solution. This imbalance results in a corresponding decrease in the temperature difference available for transferring heat from the condensing steam to the boiling brine. Thus, automatically the rate of heat addition to the system is reduced. It is appreciated however that this sequence of steps may be altered by the presence of some additional form of heating medium control to the generator.

The increased concentration of strong solution leaving the generator at part load is adjusted after solution leaves the generator. This adjustment is affected by addition of weak solution to mix with the strong solution prior to complete passage of the latter through the heat exchanger 31. Such dilution may be at a fixed or varying rate and may take place at all load conditions or only upon reduction of load to a certain fraction of full load.

Again referring to FIGURE 1, in accordance with the present invention, dilution of concentrated solution discharged from the generator 12 is only varied as the result of the operation of valve 61′ which simultaneously regulates rate of flow of weak solution from the absorber 11 into the chamber 12. Valve 61′ is responsive to the temperature of chilled water leaving the system and so serves to adjust machine conditions in accordance with variations in the load, and with requirements of particular operating temperature of chilled water at the evaporator 14.

The basic control of the system is augmented through control of the head pressure in condenser 13 by means of valve 62 responsive to the temperature of refrigerant condensate in condenser 13. As shown in FIGURE 1, valve 62 is placed in a pipe or conduit discharging cooling water from condenser 13. However, the regulation of cooling medium flow could be achieved by placing valve 62 anywhere in the cooling water circuit such as in line 28, or 29. Also, such control of flow through absorber cooling coil 24 and condenser cooling coil 18 could be achieved by means of a flow bypass or a flow diverting valve as in common in the art.

Condenser head pressure control serves to regulate the flow of cooling water primarily in response to load conditions, but also as cooling requirements may be affected by increase or decrease in ambient conditions. The latter are reflected in temperature changes of cooling water passing through the cooling tower. Such variation in the rate of flow of cooling water is common practice in many forms of apparatus in which heat must be rejected to some external sink by means of a liquid coolant.

Control of condenser coolant flow rate is adjusted in response to temperature which, for a saturated pure vapor condensing to liquid, is equivalent to the corresponding vapor pressure. Valve 62 is responsive to cooling water temperature and to the rate of steam liberation in the generator, and is thus only indirectly responsive to load conditions.

Control valve 61′ operates directly in response to change in load conditions. For example, at low load conditions, where concentration of absorbent sprayed into the absorber is greater than required for the load, the extra cooling resulting from excessive lowering of the vapor pressure and temperature in the evaporator will be sensed as a decrease in temperature of chilled water leaving the evaporator. This decrease in evaporator temperature or leaving chilled water temperature can be detected by any of several devices and arrangements adapted for the purpose together with suitable control means associated therewith to actuate the flow control valve. At low loads a decrease in chilled water temperature will cause valve 61′ in line 56 to open, thus increasing the flow of weak solution through line 56 into receiver 57. Solution flow from receiver 57 through line 58 into weir chamber 47 reduces the flow of strong solution from the generator 12 by an equal amount. Flow through line 58 correspondingly reduces the flow of weak solution to the generator 12 as required to reduce the capacity of the machine and simultaneously to maintain good thermal efficiency. With a load increase, the rise in temperature of chilled water at the evaporator will be detected and cause valve 61 to close, thereby throttling the flow of weak solution leaving the absorber at line 56. In a reversed manner, with less loads, the flow of weak solution from the absorber 11 to generator 12 will decrease, thus decreasing the rate of regeneration of weak solution and decreasing the refrigerating capacity of the system. Under theoretical full load conditions, valve 61 is completely closed, thus flow of solution is only from sump 22 through lines 32 and 54.

FIGURE 2

Figure 2:
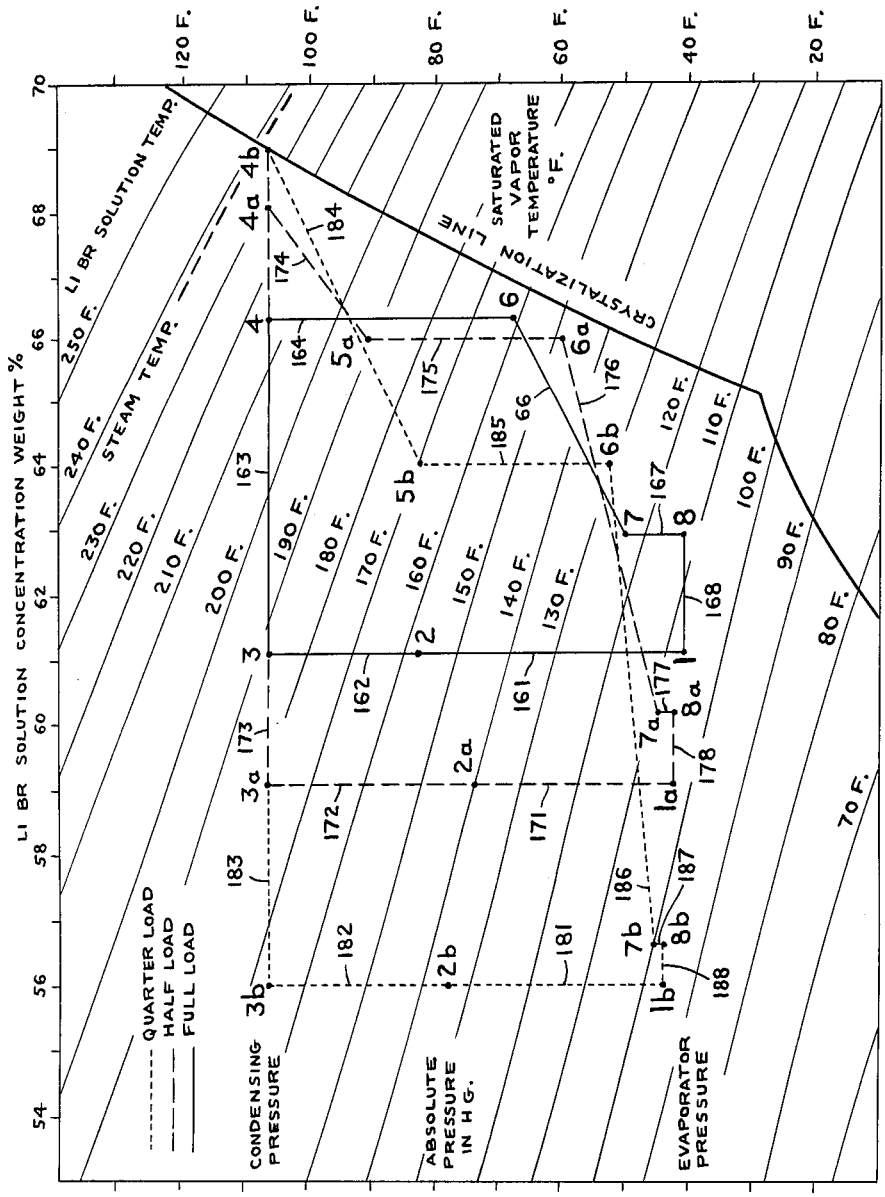
FIGURES 2 and 3 are graphical representations of the temperatures and concentrations of the saline solution as would occur with the control system disclosed herein.

FIGURE 2 represents graphically the temperature-concentration conditions in the several sections of a system similar to the system of FIGURE 1 wherein diluent is added without permitting the mixed solution to absorb water vapor by excluding the mixed solution from access to the water vapor. Thus, its vapor pressure will be lowered an indeterminate amount and, thus, a measurement of temperature cannot be used to determine the concentration.

Full load conditions are represented by the circuit formed by points 1, 2, 3, 4, 6, 7, and 8. The vertical lines represent weight percent of lithium bromide in aqueous solution. The horizontal lines represent absolute pressure, which correspond to the saturation temperature shown for the refrigerant water. The sloping lines correspond to the temperature of the lithium bromide solution in equilibrium with water at the vapor pressure shown.

The weak solution at condition 1, corresponds to 61.1% lithium bromide solution at a temperature of 107° F. Under these conditions, the weak solution enters the heat exchanger and following along path 161 is heated to temperature 2 shown as 158° F. This pre-heated weak solution enters the generator and is further heated along line 162 to point 3 at which temperature the vapor pressure of the lithium bromide equals the pressure maintained in the generator and boiling off of water vapor commences. The temperature of the solution increases as the concentration increases with the driving off of water vapor. Concentration of solution proceeds along line 163 to point 4, shown as a solution temperature of 250° F. at a pressure of 2.3 inches Hg. The concentrated solution, now at 66.3% leaves the generator and enters the heat exchanger where it is cooled along path 164 to point 6, shown as 161° F.

This partially cooled strong solution, then mixes with intermediate strength solution or with weak solution, depending on the design of the flow mixer, and the final mixture is pumped into the spray trees for flow over cooling tubes in the absorber. Solution discharged by the pump is at a higher temperature then that corresponding to the strong solution at the pressure in the absorber so that flashing occurs along a line which may be approximated by path 167 to condition 8. Absorption causes dilution of this intermediate strength solution to the concentration of the weak solution at point 1 along path 168.

At about half load conditions, the circuit is characterized by a greater spread in concentration between weak solution leaving the absorber and strong solution leaving the generator. The path defining half load conditions is indicated by the circuit 1a to 8a inclusive. Operation is similar to full load conditions except for the lower concentration of weak solution leaving the generator and going through the heat exchanger along path 171, to be heated in the generator along path 172 to temperature 3a. Temperature 3a is lower then the corresponding point 3 for full load conditions. The rate of flow to the generator is less then at part load conditions and therefore the solution is concentrated and heated to a temperature closer to the temperature of the steam used as an energy source. The final temperature and concentration of the solution leaving the generator along path 173 is shown at point 4a.

The solution is diluted so that its concentration will be reduced sufficiently to avoid crystallization in the heat exchanger. Dilution occurs along path 174 to point 5a. Partially diluted solution, shown as having a concentration of 66%, is cooled in the heat exchanger along path 175 point 6a, and then mixed. Mixing is the same as in the case of full load operation, except that the cycle conditions are now shown as paths 176 to point 7a, flashing in the absorber along path 177 to point 8a, then dilution as refrigerant vapor is absorbed along path 178 to the initial condition shown as 1a.

At about quarter load, the pattern of flow resembles that at higher part load conditions, except that a still greater spread in concentrations will develop. The evaporator temperature is closer to the temperature required for the discharge chilled water, and the temperature of the absorber solution itself is likely to be lower then at higher loads. Thus, the weak solution will perform adequately at considerably lower concentrations as indicated by point 1b shown at 56%. Likewise the strong solution in the generator will approach closer to the temperature of the available heating source, in this case shown as steam at 238° Fahrenheit, corresponding to 24 lbs. per square inch absolute.

Crystallization in the generator is avoided or kept to a minimum by adjusting the condensing pressure setting. Thus, at the minimum load point, the concentration of strong solution remains to the left of the crystallization line. The higher the pressure of steam available, the higher the condensing pressure can be set without loss of machine capacity while avoiding crystallization. Alternatively, when the steam pressure is lower, the condensing pressure can be set at a lower value, limited by the availability of cooling water.

The circuit of flow at about quarter load is shown by the graph consisting of points 1b to 8b inclusive being closed by the line 8b to 1b. Paths 181–188 are shown corresponding in operation to the path 171–178.

The arrangement of FIGURE 2 works satisfactorily to permit safe part load operation provided the several controls are in good working order and that no air enters the machine. However, there is no simple way to monitor operating conditions to assure that the desired dilution actually takes place. For example, the absorber performance may be adversely affected, if even a small quantity of air were to get into the machine, or were the temperature of the cooling water in the absorber to rise too high. When the latter occurs, the controller 61', responsive to chilled water temperature, as measured by bulb 55, would close in order to increase the flow of solution from absorber 11 to generator 12 for regeneration. This would stop the bypass flow in line 58 as well as the dilution flow in line 59. The solution in line 32 going to the generator 12 would increase in concentration and the solution leaving the generator would accordingly increase in concentration. However, since there would be no dilution flow entering through or conduit 41, the temperature would rise. Temperature sensing bulb 63 would respond to the unduly high temperature and would safely shut the machine down.

Should conditions be such that there be a small but not quite sufficient flow of dilution stream, so that the concentration is reduced to say 68%, this would correspond to a temperature of 220 F. along line 184. This would be an apparently safe temperature, whereas in reality, it would be associated with an excessively high concentration of lithium bromide, which on passing through the heat exchanger would partially or completely crystallize.

The arrangement shown in FIGURE 2 represents dilution systems in which the diluent stream is admitted into a closed duct or pipe, having no access the vapor in the generator space. In such a closed duct or pipe system, there is no way of establishing the vapor pressure of the fluid. With a solute and solvent pair, temperature in the absence of knowledge of the vapor pressure is insufficient to establish the concentration of solute in the solvent.

Figure 3:
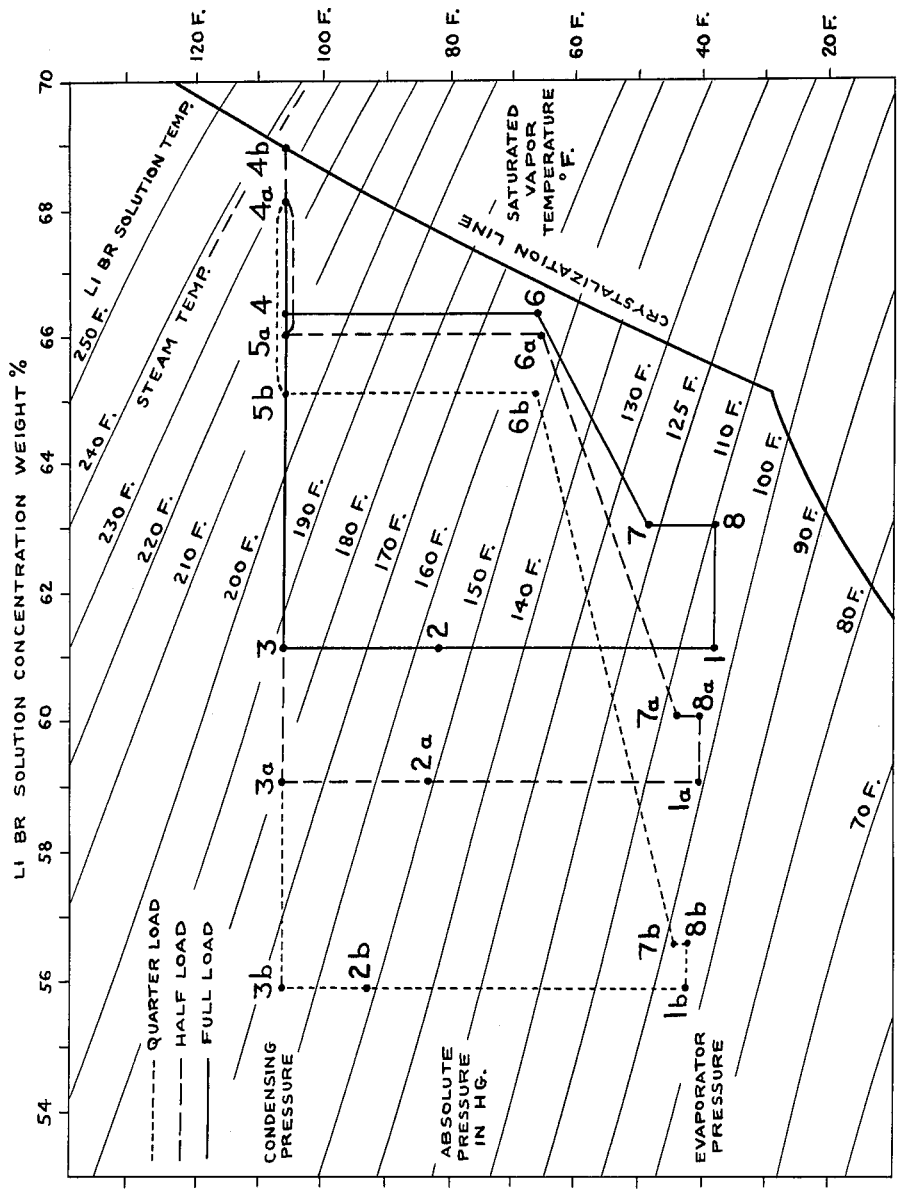

In the arrangement shown in the conditions represented diagramatically in FIGURE 3 the stream which leaves the generator 12 in its passage to the entrance of the heat exchanger 30 flows in an open conduit exposed to the vapors of the generator, so that the partial pressure of the solvent water is equal to the pressure of the vapor formed in the generator. In such an arrangement, the measure of the temperature of the solution serves to establish the concentration of the solution—the pressure already having been set by the condition of vapor pressure in the generator. Hence by setting the high temperature safety control bulb 63 at the required temperature value, it is possible to arrange for shutdown of the system whenever the temperature, and hence the concentration exceeds a set safe value.

FIGURE 3 repersents the temperature and concentration conditions in the several sections of the system at different load conditions for the full arrangement shown in FIGURE 1. The dilution stream is admitted by conduit 59 into chamber 41 as distinguished from the conditions illustrated in FIGURE 2. In this way, weak solution is at equilibrium with the vapor leaving the generator by reason of the free surface. Consequently, a mixture of weak and strong solution will approach saturation conditions at the pressure of the generator.

Referring to FIGURE 1, weak solution discharged from line 59 into flow chamber 41 will absorb water vapor present in chamber 41 and will be further diluted and simultaneously raised in temperature by reason of the heated solution. The final mixture will be at the pressure corresponding to the vapor pressure of the water vapor condensing in condenser 13, allowing for the small pressure drop occurring during flow of vapor from the generator to the condenser. FIGURE 3 follows a pattern similar to that shown in FIGURE 2 with the exception that vapor pressure of the solution after mixing will remain the same as the vapor pressure prior to mixing.

FIGURE 3 further represents a condition which thermodynamically introduces a small loss to the cycle. The heat of dilution is only partially available for pre-heating the incoming weak solution to be concentrated in the generator. However, the dilution itself represents heat that could have been applied to evaporating an equivalent amount of water which would be available as refrigerant instead of diluent. Nevertheless, this loss is small enough that it can be accepted in return for the process simplification gained.

In FIGURE 1, the criterion of highest thermal efficiency may be taken as the establishment of those temperature and concentration conditions of the lithium bromide which, when represented on the temperature-concentration graph as in FIGURE 2 or 3, lead to the largest area enclosed by the path of cycle changes. One of the requirements for obtaining such an objective of maximum thermal efficiency is that dilution of the strong solution discharged from the generator should be as close as possible to the minimum required to avoid crystallization in the heat exchanger.

Experience with a type of equipment representative of commercial practice, indicates that a favorable design parameter embodies limiting of the dilution flow to a value of less than 20% of the flow rate of weak solution being directed to the generator for concentration under full load conditions. Ideally, the dilution should be such that discharge strong solution leaving the heat exchanger should be at a temperature and concentration just approaching the crystallization line. However, practical considerations dictate that the effluent of the heat exchanger be at temperature and concentration conditions above and to the left of the crystallization line.

The temperature sensor 63 is intended to sense whether the solution at points 4, 5a, or 5b at full load, half load, and quarter load conditions respectively is above normal. For this reason, the temperature sensor 63 is set to provide an alarm signal to the circuit 65 when the temperature rises above 230° Fahrenheit. If this were to occur, it would indicate that the lithium bromide solution at the particular load conditions is more highly concentrated than the normal concentration level under the specific conditions, and therefore, there is a danger of crystallization occurring. Such lithium bromide solution concentration increase could occur through plugging due to the accumulation of noncondensibles or, as discussed previously, from other causes. Plugging would, of course, cut down the flow of diluent to the chamber 41 through line 59 thus raising the concentration and accordingly the temperature of the solution. This would necessarily be sensed by the sensor 63 which would shut down the system.

The present invention may be embodied in other specific forms without departing from the spirit or essential attributes thereof and, accordingly reference should be made to the appended cliams rather than to the foregoing specification as indicating the scope of the invention.

I claim as my invention:

1. In a closed absorption system circulating saline solution and having an absorber including a solution holding sump and solution distribution means, an evaporator, a generator, a condenser, and a heat exchanger connected to pass refrigerant and absorbent therethrough, said system including a circuit communicating the absorber and the generator and carrying weak solution in varying degrees of concentration therebetween:
   (a) said heat exchanger being communicated in said circuit and carrying stream of solution at varying degrees of concentration into heat exchange contact,
   (b) conduit means for said circuit carrying a first stream of solution, said conduit means being in communication with the generator downstream side in which solution at a greater concentration than solution in said conduit means is held, said generator downstream side being in flow communication with said heat exchanger,
   (c) said solution in said first stream being operative to dilute the concentration of solution leaving the generator to avoid crystallization of solution in the heat exchanger,
   (d) and temperature sensing means operative to sense the temperature of said mixture of said first stream and said solution leaving the generator, said temperature sensing means providing an output signal responsive to excessive temperature.

2. The closed absorption system of claim 1 temperature sensing means is operative to stop the operation of said absorption system when said temperature sensing means transmits an alarm signal.

3. The closed absorption system of claim 1 wherein said refrigerant is water, said solution being a lithium bromide solution, said temperature sensing means being operative at a temperature below the crystallization temperature for the lithium bromide solution at the vapor pressure in the generator.

4. The closed absorption system of claim 3 wherein said temperature sensing means is operative at approximately 230° Fahrenheit.

5. In a closed absorption system circulating saline solution and having an absorber including a solution holding sump, solution distribution means, an evaporator, a generator, a condenser, and a heat exchanger, connected to pass refrigerant and absorbent therethrough, said system including a circuit communicating the absorber and the genertaor and circulating solution in varying degrees of concentration therebetween:
   (a) said heat exchanger being positioned in said circuit carrying streams of solution in varying degrees of concentration into heat exchange contact,
   (b) conduit means in said circuit carrying a stream of solution having a discharge communicated to a point downstream of the generator and introducing thereto a solution having a lesser concentration than the concentration of solution in said first stream, thereby forming a solution of intermediate concentration downstream of the generator,
   (c) flow control means in said circuit adjustable to regulate the flow of unconcentrated solution passing through said conduit means, and
   (d) temperature sensing means communicating with said point downstream of the generator to sense the temperature of said intermediate concentration solution.

6. The absorption system of claim 5 wherein said temperature sensing means is operative to transmit a signal determinative of the malfunction of said flow control means to a system controller, said system controller being operative to shut down said system upon receiving a predetermined signal from said temperature sensing means.

7. The apparatus of claim 6 wherein said refrigerant is lithium bromide, said temperature sensing means being operative to sense lithium bromide crystallization conditions in said circuit.

References Cited by the Examiner

UNITED STATES PATENTS

| | | | |
|---|---|---|---|
| 1,729,355 | 9/1929 | Munters | 62—497 |
| 2,422,401 | 6/1947 | Gaugler | 62—497 |
| 3,158,008 | 11/1964 | Aronson | 62—476 |

LLOYD L. KING, *Primary Examiner.*